United States Patent
Kye et al.

(10) Patent No.: US 8,760,607 B2
(45) Date of Patent: Jun. 24, 2014

(54) LIQUID CRYSTAL DISPLAY PANEL AND METHOD OF MANUFACTURING THE SAME

(75) Inventors: Myeong-Ha Kye, Seoul (KR); Jae-Jin Lyu, Yongin-si (KR); Ji-Won Sohn, Seoul (KR)

(73) Assignee: Samsung Display Co., Ltd. (KR)

( * ) Notice: Subject to any disclaimer, the term of this patent is extended or adjusted under 35 U.S.C. 154(b) by 1197 days.

(21) Appl. No.: 12/418,876

(22) Filed: Apr. 6, 2009

(65) Prior Publication Data

US 2010/0053526 A1 Mar. 4, 2010

(30) Foreign Application Priority Data

Aug. 27, 2008 (KR) .................. 10-2008-0084027

(51) Int. Cl.
*G02F 1/1337* (2006.01)
(52) U.S. Cl.
USPC ......................................... 349/124; 349/191
(58) Field of Classification Search
USPC ................................. 349/124, 191; 156/272.2
See application file for complete search history.

(56) References Cited

U.S. PATENT DOCUMENTS

| 5,891,357 | A  | * | 4/1999 | Akashi et al. | 252/299.01 |
| 5,953,091 | A  | * | 9/1999 | Jones et al. | 349/129 |
| 7,253,438 | B2 | * | 8/2007 | Sasabayashi et al. | 257/59 |
| 2001/0005192 | A1 | * | 6/2001 | Walton et al. | 345/87 |
| 2004/0061821 | A1 | * | 4/2004 | Takeda et al. | 349/123 |
| 2005/0285994 | A1 | * | 12/2005 | Park et al. | 349/72 |
| 2007/0188428 | A1 | * | 8/2007 | Nishiyama et al. | 345/87 |

FOREIGN PATENT DOCUMENTS

| JP | 08334786 B2 | 12/1996 |
| JP | 09005750 A | 1/1997 |
| JP | 2008134666 A | 6/2008 |
| KR | 1020080005164 A | 1/2008 |

* cited by examiner

*Primary Examiner* — Jerry Blevins
(74) *Attorney, Agent, or Firm* — Cantor Colburn LLP

(57) ABSTRACT

A liquid crystal display ("LCD") panel includes a display substrate, an opposite substrate and a liquid crystal layer. The display substrate includes a pixel electrode and a first cured layer. The first cured layer has various pretilt angles. The opposite substrate includes a common electrode and a second cured layer. The second cured layer has various pretilt angles. The liquid crystal layer includes a plurality of liquid crystal molecules pretilted at the various pretilt angles by the first and second cured layers.

15 Claims, 10 Drawing Sheets

220    210  230 240

220       210   230 240 250 260

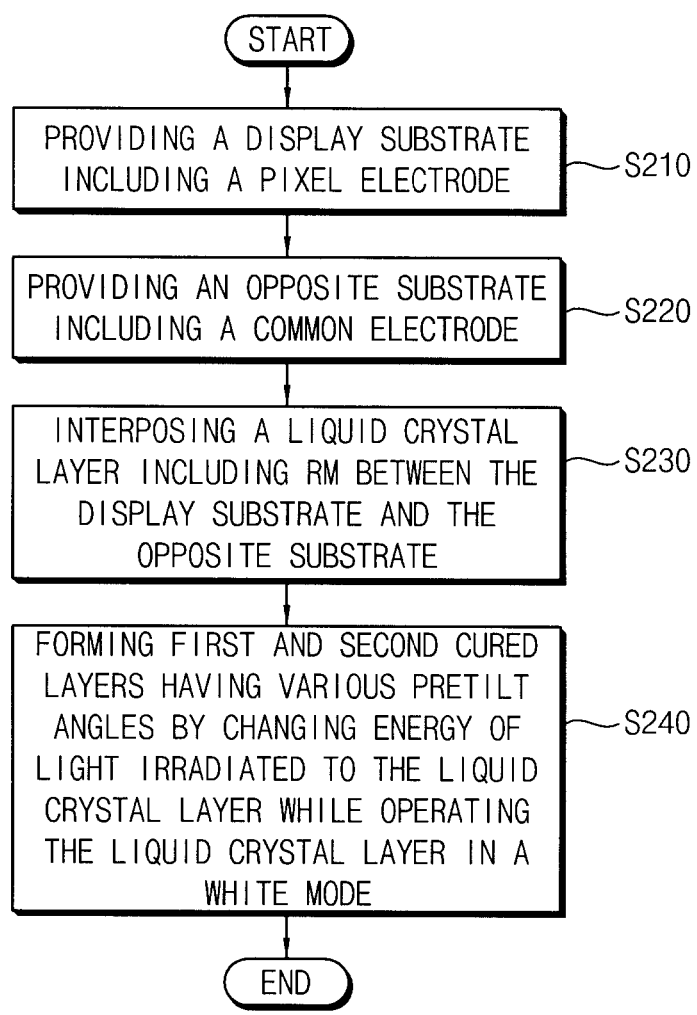

LIQUID CRYSTAL DISPLAY PANEL AND METHOD OF MANUFACTURING THE SAME

This application claims priority to Korean Patent Application No. 2008-84027, filed on Aug. 27, 2008, and all the benefits accruing 35 U.S.C. §119, the contents of which are herein incorporated by reference in their entirety.

BACKGROUND OF THE INVENTION

1. Field of the Invention

The present invention relates to a liquid crystal display ("LCD") panel and a method of manufacturing the liquid crystal display panel. More particularly, the present invention relates to an LCD panel for improving a side viewing angle and a method of manufacturing the liquid crystal display panel.

2. Description of the Related Art

A conventional liquid crystal display ("LCD") apparatus includes an LCD panel and a backlight assembly disposed under the LCD panel. The LCD panel displays images by controlling optical transmittance of liquid crystal molecules. The backlight assembly provides the LCD panel with light.

The LCD panel includes a display substrate having a pixel electrode, an opposite substrate having a common electrode, and a liquid crystal layer interposed between the display substrate and the opposite substrate.

The LCD apparatus displays the images by applying a voltage to the liquid crystal layer and controlling optical transmittance of the liquid crystal layer. In the LCD apparatus, light is transmitted only in a direction in which the light is not blocked by liquid crystal molecules of the liquid crystal layer, and thus the viewing angle of the LCD apparatus is relatively narrow. In order to widen the viewing angle, a patterned vertical alignment ("PVA") mode has been developed.

In the PVA mode, liquid crystal molecules are vertically aligned with respect to the two substrates, and a plurality of slit patterns are formed on the pixel electrode and the common electrode facing the pixel electrode to form a multi-domain structure in the pixel.

The PVA mode of the LCD panel has advantages such as high contrast ratio ("CR"), and a rubbing process is not required. However, a process of patterning the common electrode is necessary in the PVA mode.

BRIEF SUMMARY OF THE INVENTION

Since a process of patterning the common electrode is necessary in the PVA mode, there may be technical challenges in forming the common electrode of a liquid crystal display device "LCD"). For example, there is some possibility of causing a misalignment of a display substrate and an opposite substrate, or reducing a aperture ratio (e.g., a ratio of an area for a transmission of light to an area of the unit pixel) in the PVA mode, compared to a twisted nematic (TN) mode or an in-plane switching (IPS) mode, in which mode no pattern is formed on the opposite substrate. Further, the LCD apparatus in the PVA mode may have lower side visibility than front visibility thereof.

Exemplary embodiments of the present invention provide a liquid crystal display ("LCD") panel for improving the side visibility and the aperture ratio of an LCD apparatus.

Exemplary embodiments of the present invention provide a method of manufacturing the LCD panel.

In an exemplary embodiment of the present invention, a liquid crystal display ("LCD") panel includes a display substrate, an opposite substrate facing the display substrate, and a liquid crystal layer interposed between the display substrate and the opposite substrate. The display substrate includes a pixel electrode and a first cured layer disposed on the pixel electrode. The first cured layer has various pretilt angles. The opposite substrate includes a common electrode and a second cured layer disposed on the common electrode. The second cured layer has various pretilt angles. The liquid crystal layer includes a plurality of liquid crystal molecules pretilted at the various pretilt angles by the first and second cured layers.

In an exemplary embodiment of the present invention, the first and second cured layers may be formed by curing reactive mesogen ("RM") included in the liquid crystal layer.

In exemplary embodiments of the present invention, the pixel electrode may include a plurality of slit patterns. The common electrode may be disposed on a whole surface of the opposite substrate.

In an exemplary embodiment of the present invention, the pixel electrode may include a connection electrode portion and a plurality of sub-electrode portions. The connection electrode portion divides a pixel area into a plurality of sub-pixel areas. The sub-electrode portions extend in different directions from the connection electrode portion, and define a plurality of domains.

In an exemplary embodiment of the present invention, there is provided a method of manufacturing the LCD panel. In the method, a liquid crystal layer is formed between a display substrate including a pixel electrode and an opposite substrate including a common electrode. The liquid crystal layer includes a plurality of liquid crystal molecules and reactive mesogen ("RM"). A first cured layer cured at various pretilt angles and a second cured layer cured at various pretilt angles are formed on the display substrate and the opposite substrate, respectively.

In exemplary embodiments of the present invention, in order to form the first and second cured layers, an electric field may be formed at the liquid crystal layer by applying a pixel voltage to the pixel electrode and applying a common voltage to the common electrode. Further, an intensity of the electric field may be changed while irradiating light to the liquid crystal layer.

A voltage level of the pixel voltage may gradually decrease from a level higher than that for operating the liquid crystal layer in full white mode to zero to change the intensity of the electric field. The applying time of the pixel voltage may be changed according to the decreasing pixel voltage.

Alternatively, the voltage level of the pixel voltage may gradually increase from a voltage level lower than a critical voltage level for operating the liquid crystal layer in full white mode to a voltage level for operating the liquid crystal layer in full white mode to change the intensity of the electric field. The applying time of the pixel voltage may be changed according to the increasing pixel voltage.

In exemplary embodiments of the present invention, in order to form the first and second cured layers, the energy level of light irradiated to the liquid crystal layer may be changed while applying a pixel voltage to the pixel electrode and applying a common voltage to the common electrode. The voltage level of the pixel voltage may be substantially the same as a voltage level for operating the liquid crystal layer in full white mode. The energy level of the irradiated light may gradually decrease from a high energy level to a low energy level.

In an exemplary embodiment of the present invention, the light may be ultraviolet (UV) light.

In an exemplary embodiment of the method, a switching device connected to a gate line and a data line intersecting each other may be formed on a first base substrate. A passivation layer may be formed on the first base substrate on which the switching device is formed. A pixel electrode including a transparent conductive material may be formed on the first base substrate on which the passivation layer is formed. A first alignment layer may be formed on the first base substrate on which the pixel electrode is formed. Further, a color filter layer may be formed on a second base substrate. A common electrode including a transparent conductive material may be formed on the second base substrate on which the color filter layer is formed. A second alignment layer may be formed on the second base substrate on which the common electrode is formed.

In an exemplary embodiment of the present invention, the pixel electrode may include a connection electrode portion and a plurality of sub-electrode portions. The connection electrode portion is electrically connected to the switching device, and divides a pixel area into a plurality of sub-pixel areas. The sub-electrode portions extend in different directions from the connection electrode portion, and define a plurality of domains.

According to exemplary embodiments of the present invention, a cured layer cured at various pretilt angles is formed on each of a display substrate and an opposite substrate, so that side visibility may be improved.

BRIEF DESCRIPTION OF THE DRAWINGS

The above and other features and advantages of the present invention will become more apparent by describing in detailed exemplary embodiments thereof with reference to the accompanying drawings.

FIG. 13 is a flowchart for describing another exemplary embodiment of a method of manufacturing the LCD panel in accordance with the present invention.

DETAILED DESCRIPTION OF THE INVENTION

Figure 1:
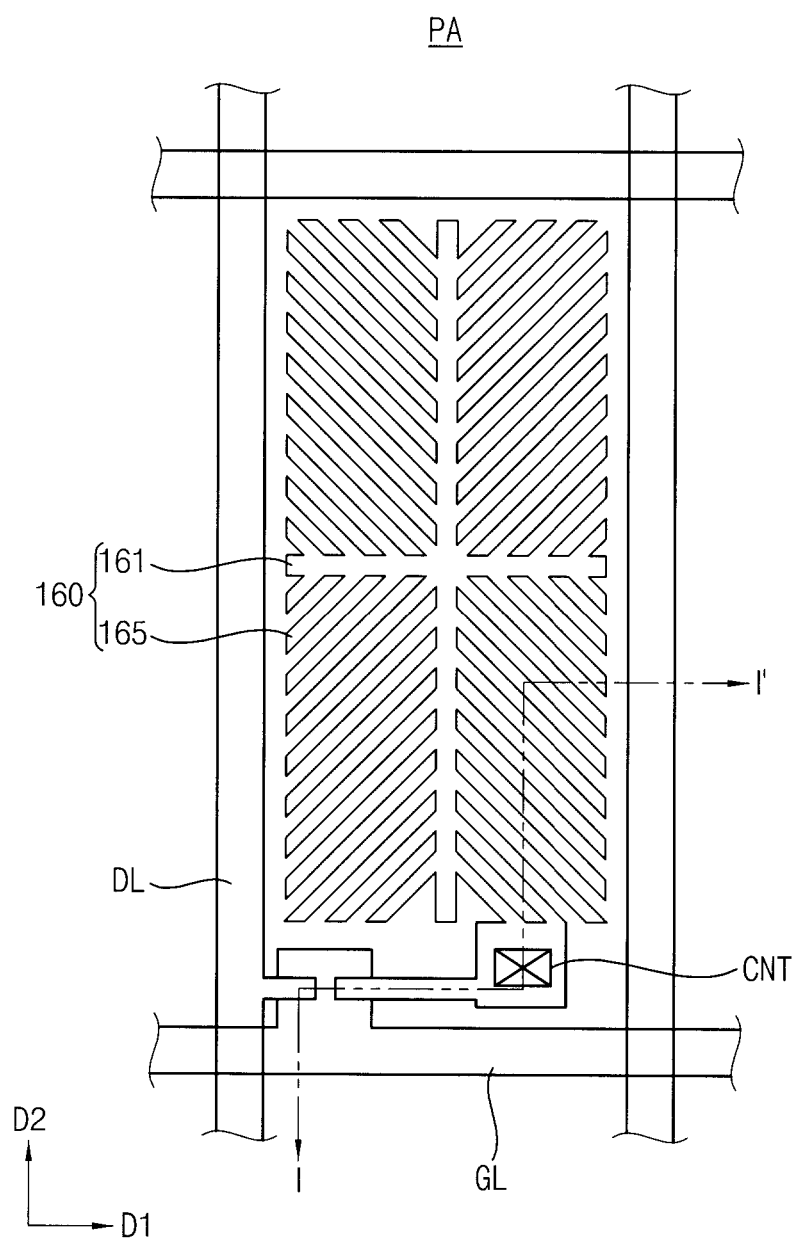
FIG. 1 is a plan view illustrating an exemplary embodiment a liquid crystal display ("LCD") panel in accordance with the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the present invention will be explained in detail with reference to the accompanying drawings.

Figure 2:
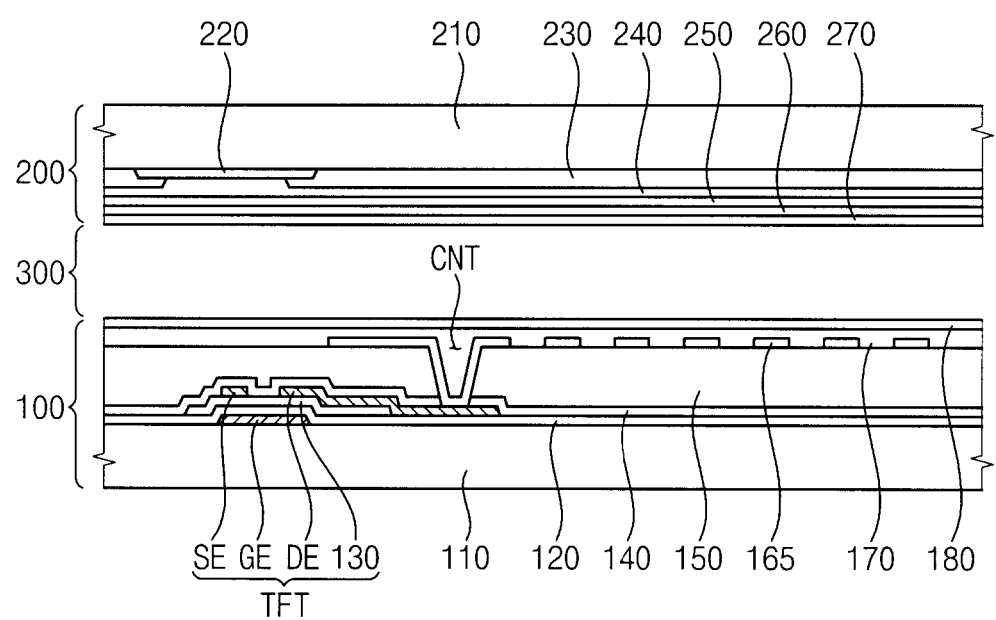
FIG. 2 is a cross-sectional view of the LCD panel taken along line I-I' in FIG. 1.

FIG. 1 is a plan view illustrating a liquid crystal display ("LCD") panel in accordance with the present invention. FIG. 2 is a cross-sectional view of the LCD panel taken along line I-I' in FIG. 1.

Referring to FIGS. 1 and 2, an LCD panel in accordance with the present invention includes a display panel 100, an opposite substrate 200 and a liquid crystal layer 300.

The display panel 100 includes a first base substrate 110 on which a pixel area PA is disposed. The display panel 100 further includes a gate line GL, a gate insulation layer 120, a data line DL, a switching device TFT, a passivation layer 140, an organic layer 150, a pixel electrode 160 and a first alignment layer 170 disposed on the first base substrate 110.

The gate line GL extends substantially in a first direction D1 on the first base substrate 110.

The gate insulation layer 120 is disposed on the first base substrate 110 to cover the gate line GL and a storage line STL (not shown). The gate insulation layer 120 is disposed overlapping and directly contacting an upper surface of the first base substrate 110.

The data line DL is disposed on the gate insulation layer 120, and extends substantially in a second direction D2 intersecting the first direction D1. The second direction D2 may be substantially perpendicular to the first direction D1.

The switching device TFT includes a gate electrode GE electrically connected to the gate line GL, a semiconductor pattern 130 disposed directly on and contacting a portion of an upper surface of the gate insulation layer 120 corresponding to the gate electrode GE, a source electrode SE electrically connected to the data line DL, and a drain electrode DE electrically connected to the pixel electrode 160. As illustrated in FIG. 2, the semiconductor layer 130 is disposed overlapping an entire of the gate electrode GE. The source electrode SE and the drain electrode DE are disposed separated from each other and overlapping the semiconductor pattern 130, such as in a layout view. The drain electrode DE is electrically connected to the pixel electrode 160 through a contact hole CNT.

The passivation layer 140 is disposed directly on portions of the gate insulation layer 120, to cover and overlap the data line DL and the switching device TFT.

The organic layer 150 is disposed between the passivation layer 140 and the pixel electrode 160, and planarizes the display panel 100.

The pixel electrode 160 is disposed directly on and contacting the organic layer 150. The pixel electrode 160 may contact portions of an upper surface of the organic layer 150, and surfaces of the organic layer 150 disposed facing the contact hole CNT. In an exemplary embodiment, the pixel electrode 160 may include a transparent conductive material. The pixel electrode 160 is electrically connected to the drain electrode DE of the switching device TFT through the contact hole CNT, formed completely through the organic layer 150 and exposing the drain electrode DE.

Referring to FIGS. 1 and 2, the pixel electrode 160 includes a connection electrode portion 161 and a plurality of a sub-electrode portion 165.

The connection electrode portion 161 is electrically connected to the drain electrode DE of the switching device TFT through the contact hole CNT. The connection electrode portion 161 divides the pixel area PA into a plurality of sub-pixel areas. In the illustrated exemplary embodiment, the connection electrode portion 161 has the shape of a cross, and divides the pixel area PA into four sub-pixel areas. The connection electrode portion 161 may include a first portion extending substantially in the first direction D1, and a second portion extending substantially in the second direction D2. The first and section portions of the connection electrode portion 161 may intersect each other at a central portion of the pixel area PA, to form the cross shape.

The sub-electrode portions 165 protrude from the connection electrode portion 161, and extend toward edges of the pixel area PA, such as toward a gate line GL and/or a data line DL. The sub-electrode portions 165 are electrically connected to the switching device TFT by the connection electrode portion 161. In an exemplary embodiment, a size of the sub-electrode portion 165 may be approximately several micrometers. Directly adjacent two sub-electrode portions 165 define a slit determining an alignment direction of liquid crystal molecules when an electric field is applied to the liquid crystal layer 300.

The connection electrode portion 161 and the sub-electrode portions 165 may be disposed as a single, continuous and indivisible unit in the pixel area PA.

The sub-electrode portions 165 extend in different directions from the connection electrode portion 161 to define a plurality of domains. In the illustrated embodiment, when the pixel area PA is divided by the connection electrode portion 161 into four sub-pixel areas, the sub-electrode portions 165 of a single sub-pixel area may extend in directions inclined at about 45 degrees, 135 degrees, 225 degrees and 315 degrees, respectively, with respect to the connection electrode portion 161 extending in a direction substantially parallel with the direction in which the gate line extends. The inclined sub-electrode portions 165 within a single sub-pixel area may be disposed substantially orthogonal to inclined sub-electrode portions 165 within an adjacent single sub-pixel area. The inclined sub-electrode portions 165 within a single first sub-pixel area may be disposed extending oppositely to inclined sub-electrode portions 165 within a single second sub-pixel area disposed diagonal from the single first sub-pixel area. Accordingly, the pixel area PA may be divided by the connection electrode portion 161 and the sub-electrode portions 165 into four domains.

Referring to FIG. 2, the first alignment layer 170 is disposed on the first base substrate 110 on which the pixel electrode 160 is disposed. The first alignment layer 170 may vertically align the liquid crystal molecules of the liquid crystal layer 300 when no electric field is applied to the liquid crystal layer 300. The first alignment layer 170 directly contacts portions of an upper surface of the organic layer 150 and the pixel electrode 160, and side surfaces of the sub-electrode portions 165.

The opposite substrate 200 is disposed to face the display substrate 100.

The opposite substrate 200 may include a second base substrate 210, a light-blocking pattern 220, a color filter layer 230, an overcoat layer 240, a common electrode 250 and a second alignment layer 260.

The light-blocking pattern 220 is disposed directly on and contacting a lower surface of the second base substrate 210, corresponding to the gate line GL, the data line DL and the switching device TFT. In a layout view, the light-blocking pattern 220 may overlap an entire of, or a portion of, the gate line GL, the data line DL and the switching device TFT.

The color filter layer 230 is disposed directly on and contacting portions of the lower surface of the second base substrate 210, corresponding to the pixel electrode 160. In a layout view, the color filer layer 230 may overlap a whole of the pixel electrode 160 including the sub-electrode portions 165. In an exemplary embodiment, the color filter layer 230 may include red, green and blue color filters.

The overcoat layer 240 is disposed between the common electrode 250 and the second base substrate 210 on which the light-blocking pattern 220 and the color filter layer 230 are directly disposed. The overcoat layer 240 may be disposed overlapping a whole of the second base substrate 210.

In an exemplary embodiment, the common electrode 250 includes a transparent conductive material. The common electrode 250 is disposed on the second base substrate 210 on which the overcoat layer 240 is disposed. The common electrode 250 faces the pixel electrode 160, and may be disposed on the whole surface of the second base substrate 210, and the common electrode may not include any slit patterns unlike the pixel electrode discussed previously. A common voltage Vcom is applied to the common electrode 250.

The second alignment layer 260 is disposed on the common electrode 250. The second alignment layer 260 may vertically align liquid crystal molecules of the liquid crystal layer 300 when no electric field is applied to the liquid crystal layer 300.

The liquid crystal layer 300 is interposed between the display substrate 100 and the opposite substrate 200. The liquid crystal layer 300 includes the liquid crystal molecules, and may further include reactive mesogen ("RM"). The RM is a photosensitive compound. In an exemplary embodiment, the RM disposed in the liquid crystal layer 300 may react to light, such as ultraviolet ("UV") light, and form a first cured layer 180 and a second cured layer 270 on the first and second alignment layers 170 and 260, respectively. The first cured layer 180 may define an uppermost layer of the display substrate 100, and the second cured layer 270 may define a lowermost layer of the opposite substrate 200. Each of the first cured layer 180 and the second cured layer 270 may overlap a whole of the first and second base substrates 110 and 210.

The first cured layer 180 is disposed directly on the first alignment layer 170, and the second cured layer 270 is disposed directly on the second alignment layer 260. In an exemplary embodiment, the first and second cured layers 180 and 270 may have various pretilt angles.

Figure 3:
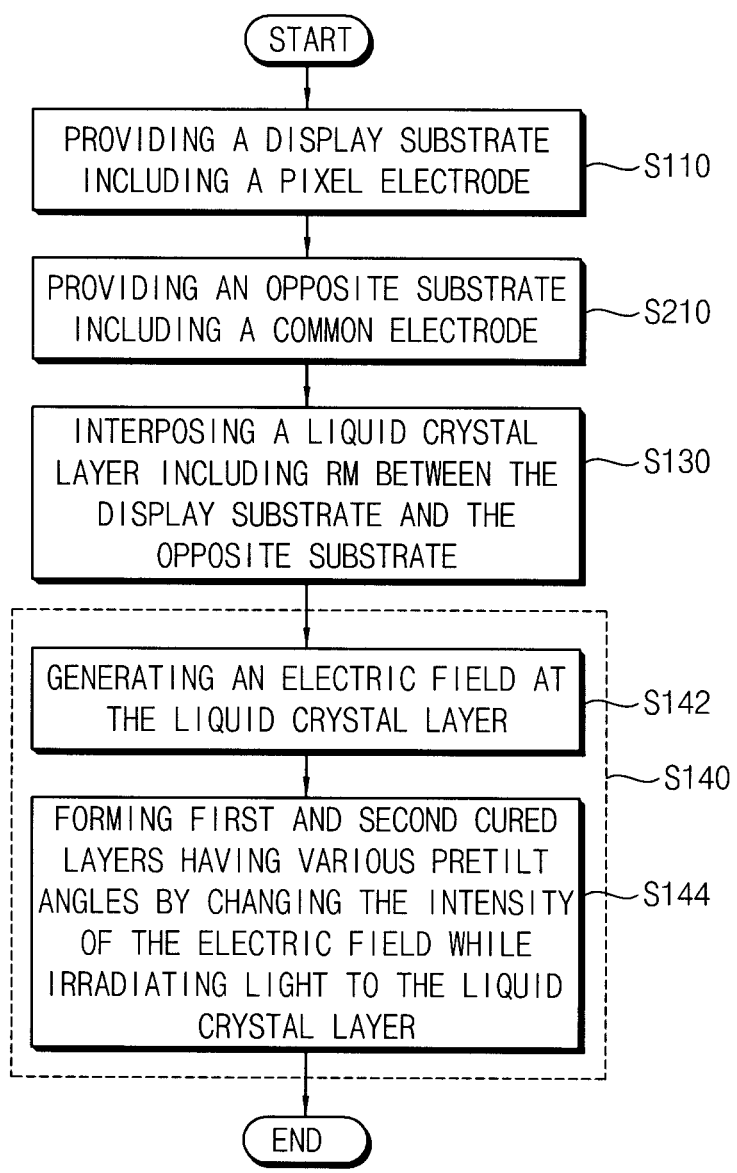
FIG. 3 is a flowchart for describing an exemplary embodiment of a method of manufacturing the LCD panel illustrated in FIG. 2.
Figure 4A:
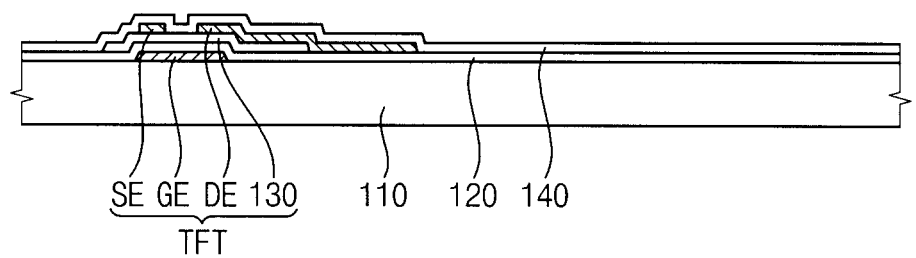
FIGS. 4A and 4B are cross-sectional views illustrating a display substrate to describe an exemplary embodiment of a method of manufacturing the display substrate illustrated in FIG. 2.
Figure 4B:
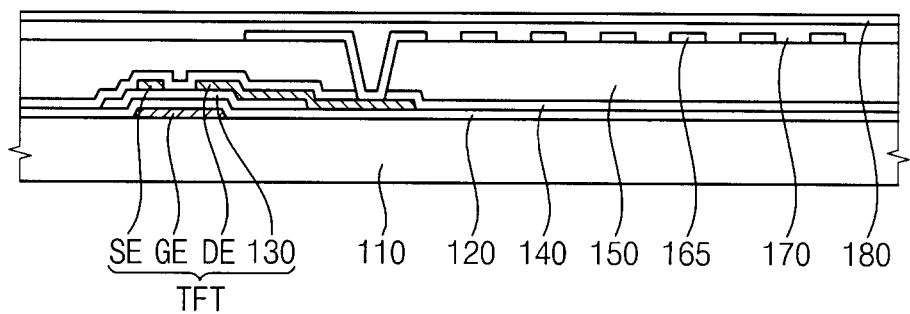
Figure 5A:
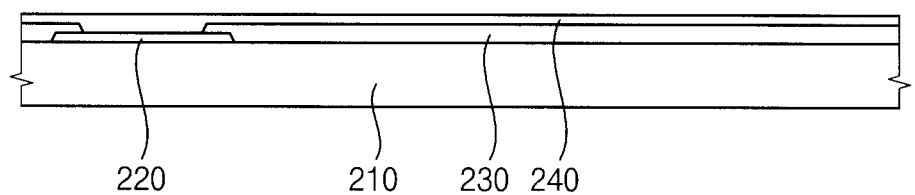
FIGS. 5A and 5B are cross-sectional views illustrating an opposite substrate to describe an exemplary embodiment of a method of manufacturing the opposite substrate illustrated in FIG. 2.
Figure 5B:
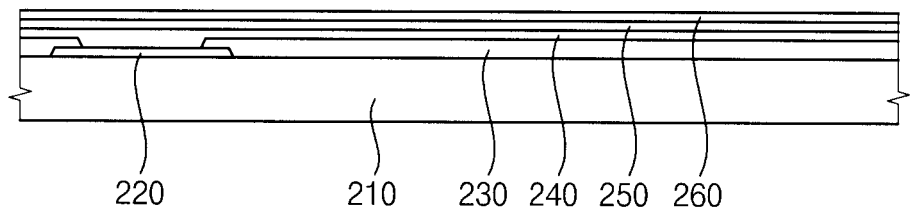

FIG. 3 is a flowchart for describing an exemplary embodiment of a method of manufacturing the LCD panel illustrated in FIG. 2. FIGS. 4A and 4B are cross-sectional views illustrating a display substrate to describe an exemplary embodiment of a method of manufacturing the display substrate illustrated in FIG. 2. FIGS. 5A and 5B are cross-sectional views illustrating an opposite substrate to describe an exemplary embodiment a method of manufacturing the opposite substrate illustrated in FIG. 2.

Referring to FIGS. 3 and 4A, the display substrate 100 including the pixel electrode 160 formed on the first base substrate 110 is provided (step S110). In one exemplary embodiment, a gate metal layer is formed on the first base substrate 110. The gate metal layer is patterned to form a gate metal pattern including the gate line GL and the gate electrode GE. The gate insulation layer 120 is formed on the first base substrate 110 on which the gate metal pattern is formed. The semiconductor pattern 130 is formed on the first base substrate 110 on which the gate insulation layer 120 is formed. A source metal layer is formed on the first base substrate 110 on which the semiconductor pattern 130 is formed. The source metal layer is patterned through a photolithographic process to form a source metal pattern including the data line DL, the source electrode SE and the drain electrode DE. The passivation layer 140 is formed on the first base substrate 110 on which the source metal pattern is formed. The passivation layer 140 may include silicon nitride, silicon oxide, etc.

Referring to FIGS. 3 and 4B, the organic layer 150 is formed on the first base substrate 110 on which the passivation layer 140 is formed. In one exemplary embodiment, the organic layer 150 may include a positive-type photoresist composition. The passivation layer 140 and the organic layer 150 may be etched to form the contact hole CNT exposing the drain electrode DE. A transparent conductive layer is formed on the first base substrate 110 on which the contact hole CNT is formed. The transparent conductive layer is patterned to form the pixel electrode 160 including the connection electrode portion 161 and the plurality of a sub-electrode portion 165. The first alignment layer 170 is formed on the first base substrate 110 on which the pixel electrode 160 is formed.

Referring to FIGS. 3 and 5A, the opposite substrate 200 including the common electrode 250 is provided (step S120). In one exemplary embodiment, the light-blocking layer 220 is formed on the second base substrate 210, corresponding to the gate line GL, the data line DL and the switching device TFT. The color filter layer 230 is formed on the second base substrate 210 on which the light-blocking layer 220 is formed. The color filter layer 230 may be formed in the pixel area PA, and may include red, green and blue color filters. The overcoat layer 240 is formed on the second base substrate 210 on which the color filter layer 230 is formed. The overcoat layer 240 compensates a step difference of the color filter layer 230 to planarize the second base substrate 210.

Referring to FIGS. 3 and 5B, the common electrode 250 including a transparent conductive material is formed on the second base substrate 210 on which the overcoat layer 240 is formed. The common electrode 250 may not be patterned, and may be formed on the whole surface of the second base substrate 210. The second alignment layer 260 is formed on the common electrode 250. The second alignment layer 260 may vertically align the liquid crystal molecules of the liquid crystal layer 300.

The display substrate 100 and the opposite substrate 200 are combined. The liquid crystal molecules and the RM may be injected between the combined display substrate 100 and opposite substrate 200 to form the liquid crystal layer 300 (step S130).

The first and second cured layers 180 and 270 are formed on the first and second alignment layers 170 and 260 (step S140). The first and second cured layers 180 and 270 are disposed directly adjacent to the liquid crystal layer 300 and the first and second alignment layers 170 and 260.

In an exemplary embodiment, a process of forming the first and second cured layers 180 and 270 may be as follows. A pixel voltage is applied to the pixel electrode 160, and a common voltage is applied to the common electrode 250, in order to generate an electric field at the liquid crystal layer 300 (step S142). While light is irradiated to the liquid crystal layer 300, the intensity of the electric field formed at the liquid crystal layer 300 is changed at substantially a same time, so that the first and second cured layers 180 and 270 are formed to have various pretilt angles (step S144). The energy of the light irradiated to the liquid crystal layer 300 may be unchanged, and remain substantially constant.

The intensity of the electric field may be changed by adjusting the level of the pixel voltage applied to the pixel electrode 160. The voltage level of the pixel voltage may be gradually decreased from a level relatively higher than that for operating the liquid crystal layer 300 in full white mode, to zero. In one exemplary embodiment, the voltage level for operating the liquid crystal layer 300 in full white mode may be about 30 V (volts).

Alternatively, in order to change the intensity of the electric field, the voltage level of the pixel voltage may be gradually increased from a level relatively lower than the lowest level (i.e., critical voltage level) for operating the liquid crystal layer 300, to the level for operating the liquid crystal layer 300 in full white mode. In one exemplary embodiment, the lowest voltage level for operating the liquid crystal layer 300 may be about 2.5 V (volts). The pixel voltage may be in a range of about 0 V to about 50 V.

Table 1 to Table 4 show exposure conditions for forming the first and second cured layers 180 and 270 according to exemplary embodiments of the present invention.

TABLE 1

| Pixel Voltage | Applying Time | Irradiation Energy |
|---|---|---|
| 7 V | 60 seconds | 2.28 joules (J) |
| 6 V | 60 seconds | 2.28 joules (J) |
| 5 V | 60 seconds | 2.28 joules (J) |
| 4 V | 60 seconds | 2.28 joules (J) |
| 3 V | 60 seconds | 2.28 joules (J) |
| 2 V | 60 seconds | 2.28 joules (J) |
| 1 V | 60 seconds | 2.28 joules (J) |
| 0 V | 632 seconds | 24.04 joules (J) |

TABLE 2

| Pixel Voltage | Applying Time | Irradiation Energy |
|---|---|---|
| 10 V | 30 seconds | 1.14 joules (J) |
| 9 V | 30 seconds | 1.14 joules (J) |
| 8 V | 30 seconds | 1.14 joules (J) |
| 7 V | 30 seconds | 1.14 joules (J) |
| 6 V | 30 seconds | 1.14 joules (J) |
| 5 V | 30 seconds | 1.14 joules (J) |
| 4 V | 30 seconds | 1.14 joules (J) |
| 3 V | 30 seconds | 1.14 joules (J) |
| 2 V | 30 seconds | 1.14 joules (J) |
| 1 V | 30 seconds | 1.14 joules (J) |
| 0 V | 752.63 seconds | 28.6 joules (J) |

TABLE 3

| Pixel Voltage | Applying Time | Irradiation Energy |
|---|---|---|
| 10 V | 90 seconds | 3.42 joules (J) |
| 8 V | 45 seconds | 1.71 joules (J) |
| 6 V | 30 seconds | 1.14 joules (J) |
| 4 V | 15 seconds | 0.57 joule (J) |
| 2 V | 15 seconds | 0.57 joule (J) |
| 0 V | 752.63 seconds | 32.59 joules (J) |

TABLE 4

| Pixel Voltage | Applying Time | Irradiation Energy |
|---|---|---|
| 1 V | 30 seconds | 1.14 joules (J) |
| 2 V | 30 seconds | 1.14 joules (J) |
| 3 V | 30 seconds | 1.14 joules (J) |
| 4 V | 30 seconds | 1.14 joules (J) |
| 5 V | 30 seconds | 1.14 joules (J) |
| 6 V | 30 seconds | 1.14 joules (J) |
| 7 V | 30 seconds | 1.14 joules (J) |
| 8 V | 30 seconds | 1.14 joules (J) |
| 9 V | 30 seconds | 1.14 joules (J) |
| 10 V | 30 seconds | 1.14 joules (J) |
| 0 V | 752.63 seconds | 28.6 joules (J) |

Referring to Table 1 to Table 4, the voltage level of the pixel voltage may be gradually decreased from the relatively high voltage level to the low voltage level, and the applying time of the pixel voltage and the irradiation energy of the light may be unchanged, as shown in Table 1.

In another exemplary embodiment, as shown in Table 2, the initial voltage level of the pixel voltage may be higher than that shown in Table 1. Further, the applying time of the pixel voltage may be shorter that that shown in Table 1, and the irradiation energy of the light may be smaller that that shown in Table 1.

In still another exemplary embodiment, the voltage level of the pixel voltage may be gradually decreased at an interval of 2 V from the initial voltage level, and the applying time of the pixel voltage and the irradiation energy of the light may be changed as shown in Table 3.

Alternatively, the voltage level of the pixel voltage may be gradually increased from the low voltage level to the high voltage level as shown in Table 4.

While the voltage level of the pixel voltage is gradually changed, light having substantially the same (e.g., constant) irradiation energy may be irradiated to the liquid crystal layer 300, as shown in Table 1, Table 2 and Table 4. Alternatively, light whose irradiation energy is changed according to the voltage level of the pixel voltage may be irradiated to the liquid crystal layer 300 as shown in Table 3. When the pixel voltage having a relatively high voltage level is applied, and the light having high irradiation energy is irradiated to the liquid crystal layer 300, the time required to cure the RM may be reduced.

Figure 6:
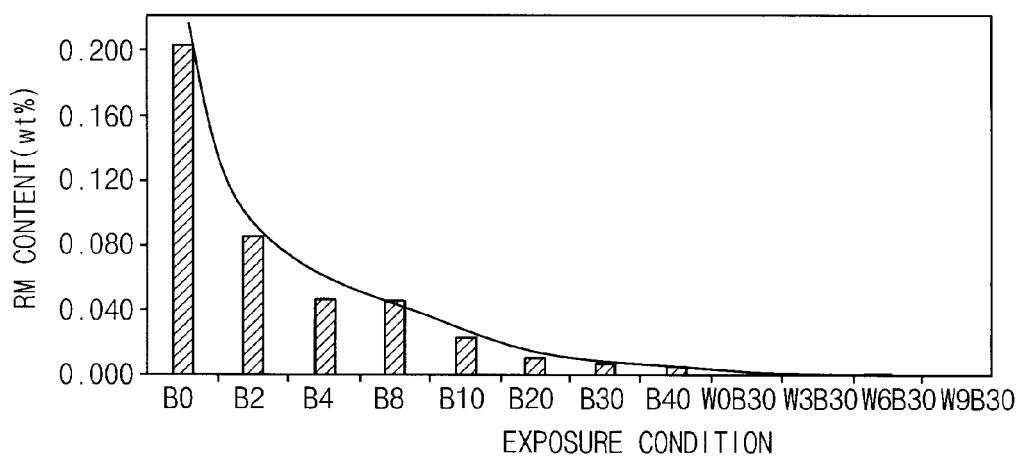
FIG. 6 is a graph for describing an exemplary embodiment of a variation of reactive mesogen ("RM") content according to an exposure condition in an exposure process.

FIG. 6 is a graph for describing an exemplary embodiment of a variation of RM content according to an exposure condition in an exposure process.

In FIG. 6, a horizontal axis (x-axis) represents an exposure condition, particularly, the energy level of light irradiated to the liquid crystal layer 300 and whether an electric field is applied to the liquid crystal layer 300. A vertical axis (y-axis) represents the RM content included in the liquid crystal layer 300. In the horizontal axis (x-axis), "B" represents an exposure without an electric field, and "W" represents an exposure with an electric field. The numbers on the horizontal axis represent the energy level of light irradiated to the liquid crystal layer 300. For example, "B0" represents that the energy level of light is zero and no electric field is applied to the liquid crystal layer 300. That is, "B0" represents the state before beginning the exposure process. "W9B30" represents that light having an energy level of 9 J is irradiated to the liquid crystal layer 300 with an electric field applied thereto in a first exposure process, and light having an energy level of 30 J is irradiated to the liquid crystal layer 300 without an electric field in a second exposure process.

Referring to FIG. 6, it can be seen that that the RM content included in the liquid crystal layer 300 decreases as the exposure level (i.e., irradiating energy) increases. The pixel voltage may be changed as the following Equation 1, taking the time required to cure the RM into consideration.

$$Y = A(e^{-Bx})$$ [Equation 1]

In Equation 1, "Y" represents a changed pixel voltage, and "A" represents an initial pixel voltage. The initial pixel voltage may be in a range of 0 V to about 50 V. "B" represents a slope, and the slope may be in a range of about 0.05 to about 10. "x" represents the exposure level.

Figure 7:
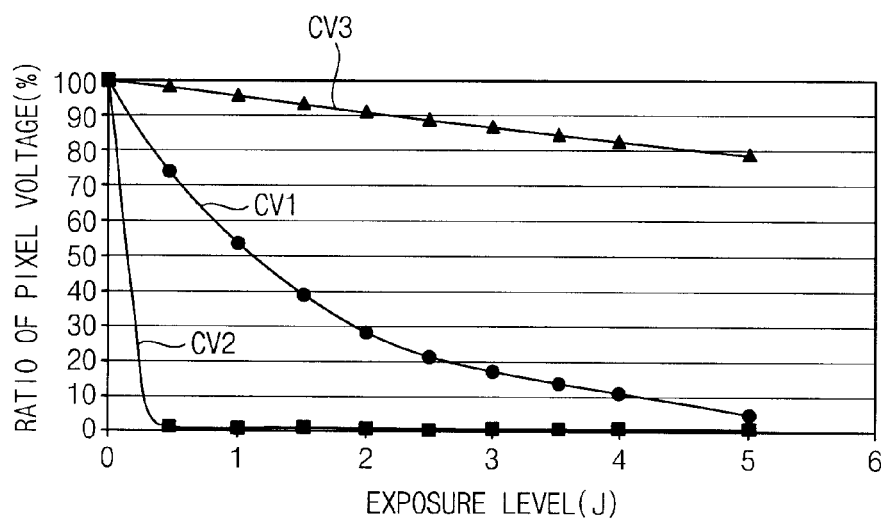
FIG. 7 is a graph for describing an exemplary embodiment of a variation of a pixel voltage according to exposure level.

FIG. 7 is a graph for describing an exemplary embodiment of a variation of a pixel voltage according to exposure level.

In FIG. 7, a horizontal axis (x-axis) represents exposure level, and a vertical axis (y-axis) represents a ratio of a variable pixel voltage to the initial pixel voltage. A first curve CV1 represents a variation of a pixel voltage according to the exposure level when the slope (B) is 10. A second curve CV2 represents a variation of a pixel voltage according to the exposure level when the slope (B) is 0.6147. A third curve CV3 represents a variation of a pixel voltage according to the exposure level when the slope (B) is 0.05. The pixel voltage may be exponentially changed as in the graph shown in FIG. 7. However, the present invention is not limited to the illustrated embodiment. In an alternative exemplary embodiment, the pixel voltage may be linearly changed.

Figure 8:
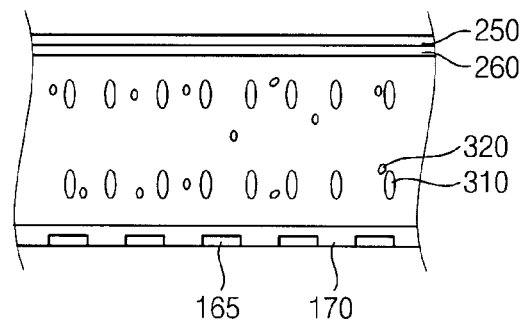
FIG. 8 is a cross-sectional view illustrating an LCD panel to describe an exemplary embodiment of a distribution of the liquid crystal molecules when no electric field is applied to the LCD panel illustrated in FIG. 1.
Figure 9A:
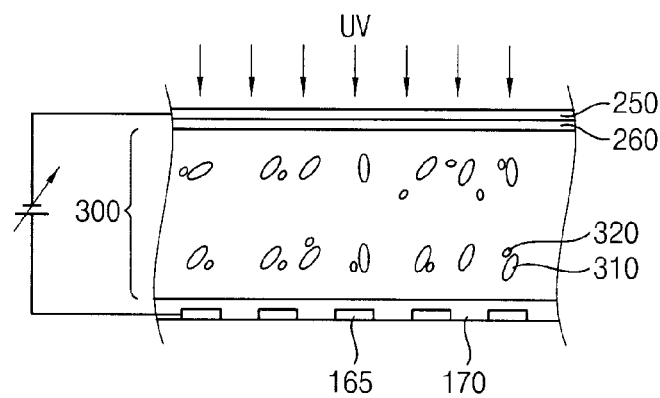
FIGS. 9A and 9B are cross-sectional views illustrating an LCD panel to describe an exemplary embodiment of a method of forming the cured layer in the LCD panel illustrated in FIG. 1.
Figure 9B:
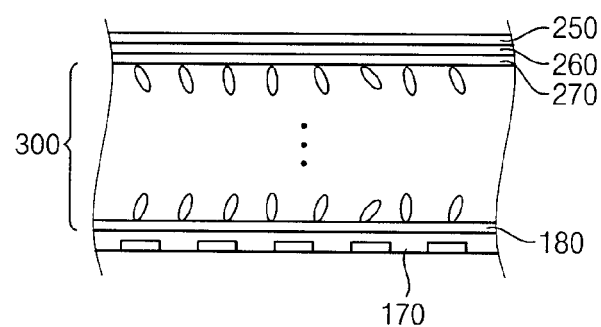

FIG. 8 is a cross-sectional view illustrating an LCD panel to describe the distribution of the liquid crystal molecules when no electric field is applied to the LCD panel illustrated in FIG. 1. FIGS. 9A and 9B are cross-sectional views illustrating an LCD panel to describe a method of forming the cured layer in the LCD panel illustrated in FIG. 1.

Referring to FIG. 8, when any voltage is not applied to the pixel electrode 160 and the common electrode 250 (i.e., in a state with no electric field), the liquid crystal molecules 310 of the liquid crystal layer 300 may be aligned in a vertical direction, or substantially perpendicular to the first and second base substrates 110 and 210. The liquid crystal layer 300 includes the RM 320.

Referring to FIGS. 9A and 9B, while a pixel voltage is applied to the pixel electrode 160 and a common voltage is applied to the common electrode 250, UV light is irradiated to the liquid crystal layer 300 as indicated by the downward arrows in FIG. 9A. When the voltage level of the pixel voltage is changed during the irradiation of the light, the intensity of the electric field formed at the liquid crystal layer 300 is changed, so that angles at which the liquid crystal molecules 310 are tilted, become various. The liquid crystal molecules 310 do not have the same tilt angle, but have various tilt angles.

The RM 320 initially included in the liquid crystal layer 300 is cured by the UV light to form the first and second cured layers 180 and 270 directly on the first and second alignment layers 170 and 260, respectively. The liquid crystal molecules 310 adjacent to respective first and second alignment layers 170 and 260, are essentially fixed to the first and second cured layers 180 and 270, and have the various tilt angles as described above. The liquid crystal molecules 310 fixed to the first and second cured layers 180 and 270 are considered as pretilted in an LCD device, as illustrated in FIG. 9B, even when no electric field is applied to the liquid crystal layer 300.

Figure 10:
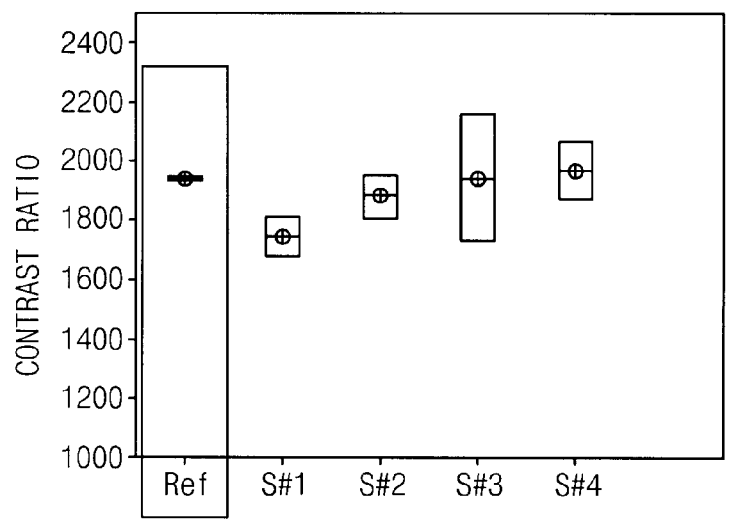
FIG. 10 is a graph showing an exemplary embodiment of a front contrast ratio according to an exposure condition in an exposure process.
Figure 11:
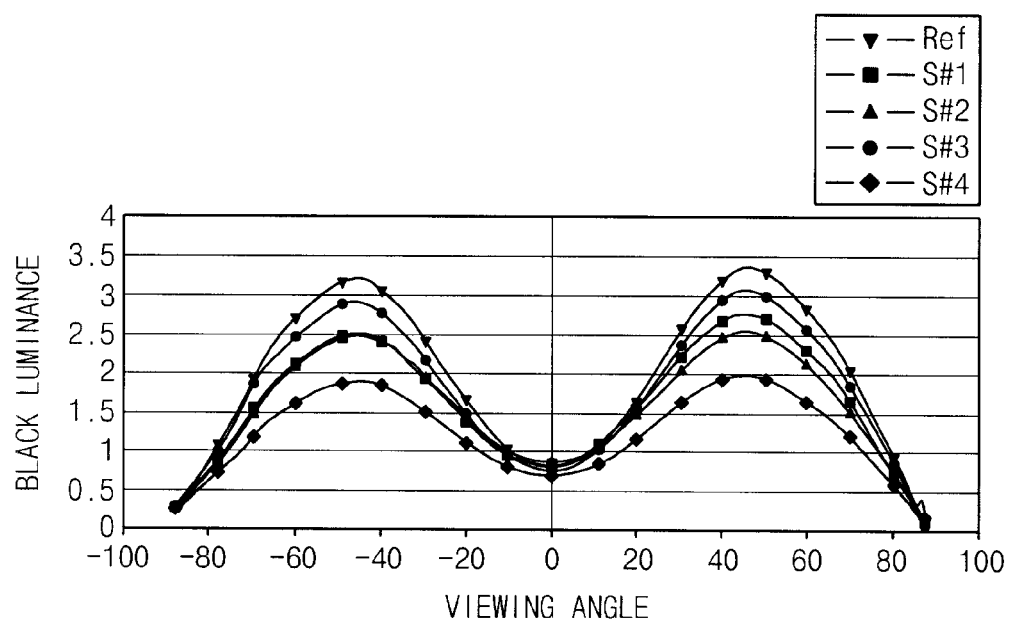
FIG. 11 is a graph for describing an exemplary embodiment of a distribution of black luminance according to viewing angles.

FIG. 10 is a graph showing an exemplary embodiment of a front contrast ratio according to an exposure condition in an exposure process. FIG. 11 is a graph for describing an exemplary embodiment of a distribution of black luminance according to viewing angles.

Referring to FIGS. 10 and 11, reference (Ref) is an LCD panel including a cured layer having the same pretilt angle. The cured layer of the reference (Ref) is formed while a pixel voltage is fixed at a voltage level for operating the liquid crystal layer 300 in full white mode. Sample 1 (S#1) is an LCD panel including a cured layer cured at various pretilt angles, and the cured layer of Sample 1 (S#1) is formed according to the exposure condition shown in Table 1. Sample 2 (S#2) is an LCD panel including a cured layer cured at various pretilt angles, and the cured layer of Sample 2 (S#2) is formed according to the exposure condition shown in Table 2. Sample 3 (S#2) is an LCD panel including a cured layer cured at various pretilt angles, and the cured layer of Sample 3 (S#3) is formed according to the exposure condition shown in Table 3. Sample 4 (S#4) is an LCD panel including a cured layer cured at various pretilt angles, and the cured layer of Sample 4 (S#4) is formed according to the exposure condition shown in Table 4.

As shown in FIG. 10, in the LCD panels of Samples 1, 2, 3 and 4 (S#1, S#2, S#3, S#4) according to exemplary embodiments of the present invention, it can be seen that that the contrast ratio in front (i.e., front contrast ratio) is similar to the front contrast ratio of the LCD panel corresponding to the reference (Ref).

Referring to FIG. 11, it can be seen that that levels of black luminance in side of the Samples 1, 2, 3 and 4 (S#1, S#2, S#3, S#4) are lower than the level of black luminance in side of the LCD panel corresponding to the reference (Ref). The contrast ratio is defined as a ratio of white luminance to black luminance. Since the white luminance is substantially the same, the contrast ratio is estimated from the black luminance. As shown in FIG. 11, the levels of black luminance in side of Samples 1 to 4 (S#1, S#2, S#3, S#4) are lower than the level of black luminance in side of the LCD panel corresponding to the reference (Ref). The lower level of black luminance in side represents that the side contrast ratio is large and a side light leakage of the LCD panel is small. Advantageously, when an exposure condition according to the illustrated exemplary embodiments of the present invention is applied to a method of manufacturing an LCD panel, the side contrast ratio may be improved and the side light leakage of the LCD panel may be reduced.

A difference of response time (RT) of liquid crystal molecules between the LCD panel of the reference (Ref) and the samples according to exemplary embodiments of the present invention was examined. It is noted that the cured layer of the reference (Ref) is formed while a pixel voltage is fixed at a voltage level for operating the liquid crystal layer 300 in full white mode, and the cured layer according to the present invention is formed while the pixel voltage is changed.

Figure 12A:
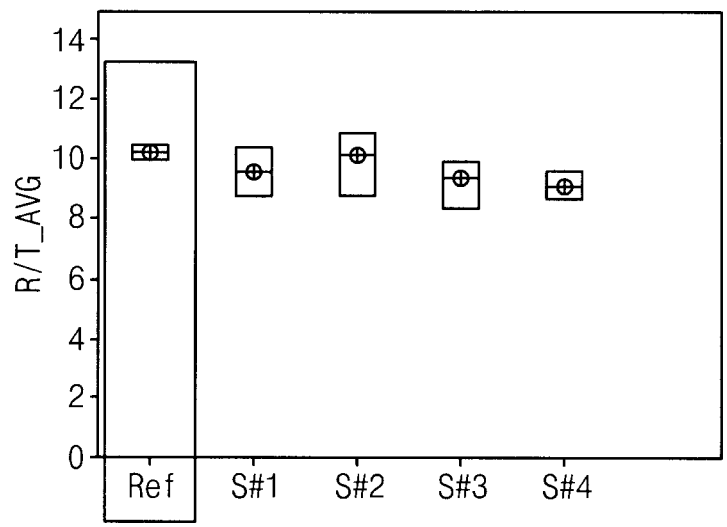
FIGS. 12A and 12B are graphs showing a response time according to an exposure condition.
Figure 12B:
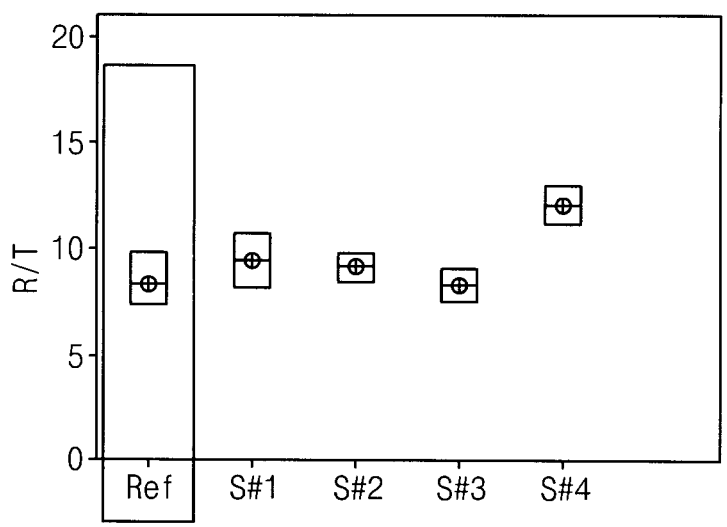

FIGS. 12A and 12B are graphs showing exemplary embodiments of a response time according to an exposure condition.

FIG. 12A shows average gray-to-gray response times (RT_AVG) of the liquid crystal molecules according to an exposure condition. "Gray-to-gray response time" represents a response time of the liquid crystal molecules when a gray level of displayed images is changed from one to another. The average gray-to-gray response times (RT_AVG) is calculated as follows. The gray levels (for example, 0 to 256 gray levels) are divided into predetermined groups (for example, 8 groups), and the gray-to-gray response times are measured in each of the groups. Herein, the "average gray-to-gray response time" is an average of the measured gray-to-gray response times. As shown in FIG. 12A, it can be seen that that the average gray-to-gray response times of Samples 1 to 4 (S#1, S#2, S#3, S#4) are substantially similar to, or faster than the average gray-to-gray response time of the reference LCD panel (Ref).

FIG. 12B shows total response times required to display all of the gray levels (for example, 0 to 256 gray levels). The total response times of Samples 1 to 3 (S#1, S#2, S#3) were slightly different from the total response time of the reference LCD panel (Ref), but the total response time of the Sample 4 (S#4) was slower than that of the reference LCD panel (Ref). When the voltage level of the pixel voltage may gradually increase from the low voltage level to the high voltage level as shown in Table 4 (i.e., Sample 4), the side light leakage may be effectively reduced, but the response time may be somewhat slow. However, when the voltage level of the pixel voltage may gradually decrease from the high voltage level to the low voltage level as shown in Tables 1, 2 and 3 (i.e., Samples 1, 2 and 3), the side light leakage may be effectively reduced, and the response time was also excellent.

According to the present invention, a slit pattern is not formed on the common electrode 250, and thus a patterning process for the common electrode 250 may be advantageously omitted, thereby reducing manufacturing time and costs. A misalignment between the display substrate 100 and the opposite substrate 200 may be reduced or effectively prevented. Further, the first and second cured layers 180 and 270 have various pretilt angles, so that the side light leakage may be reduced or effectively prevented. Therefore, the quality of images displayed by an LCD panel may be advantageously improved.

FIG. 13 is a flowchart for describing another exemplary embodiment of a method of manufacturing the LCD panel in accordance with the present invention.

The method described with reference to FIG. 13 may be substantially the same as the method described with reference to FIGS. 3, 4A, 4B, 5A and 5B except for a method of forming the first and second cured layers. Therefore, the same reference numbers are used for the same or similar elements, and any further descriptions concerning the same or similar elements as those shown in FIGS. 3, 4A, 4B, 5A and 5B will be omitted.

Referring to FIGS. 4A, 4B, 5A, 5B and 13, the display substrate 100 including the pixel electrode formed on the first base substrate 110 is provided (step S210).

The opposite substrate 200 including the common electrode 250 is provided (step S220).

The display substrate 100 and the opposite substrate 200 are combined. The liquid crystal molecules and the RM may be injected between the combined display substrate 100 and opposite substrate 200 to form the liquid crystal layer 300 (step S230).

While a pixel voltage for displaying full white image is applied to the pixel electrode 160 and a common voltage is applied to the common electrode 250 (i.e., with operating the liquid crystal layer 300 in a white mode), UV light is irradiated to the liquid crystal layer 300 at substantially a same time. In the illustrated exemplary embodiment, the energy of the irradiated light is adjusted to form the first and second cured layers 180 and 270 cured at various pretilt angles, directly on the first and second alignment layers 170 and 260, respectively (step S240). The energy level of the light may be gradually decreased from the relatively high energy level to the relatively low energy level. Alternatively, the energy level of the light may gradually increase from the relatively low energy level to the relatively high energy level. In consideration of the response time of the liquid crystal molecules described above, it is preferable that the energy level of the light gradually decrease from the high energy level to the low energy level.

The irradiation time of light may be substantially the same in each energy level. Alternatively, the irradiation time of light may be changed according to the energy level. In one exemplary embodiment, the irradiation time of the light having a high energy level is longer than the irradiation time of the light having a low energy level. The irradiation time may gradually decrease as the energy level of the light decreases.

An exemplary embodiment of manufacturing an LCD panel may include a process of irradiating light having a high energy level to the liquid crystal layer 300 to cure remaining RM that is not cured in the liquid crystal layer 300, while no electric field is applied thereto.

In the illustrated exemplary embodiments, an LCD structure including LC molecules of an LC layer which are pre-tilted, without having a patterned common electrode, may be formed by forming curing layers through an exposure process of the LC layer which includes reactive mesogen (RM). Since the pre-tilted condition of the LC molecules is imparted by processing the LC layer having specific material characteristics (e.g., including the RM), such a process to the LC layer is considered to impart the distinct structural characteristic of pre-tilted condition of the LC molecules of the final LCD structure.

According to the exemplary embodiments of the present invention, in an exposure process for forming cured layers on a pixel electrode and a common electrode, an electric field applied to the liquid crystal layer is changed or an energy field of light irradiated to the liquid crystal layer is changed, so that the cured layers have various pretilt angles. Therefore, a side viewing angle may be increased, and the side light leakage may be reduced. Accordingly, the quality of an image displayed by an LCD panel may be improved.

The foregoing is illustrative of the present disclosure and is not to be construed as limiting thereof. Although a few exemplary embodiments of the present invention have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims.

In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific exemplary embodiments disclosed, and that modifications to the disclosed exemplary embodiments, as well as other exemplary embodiments, are intended to be included within the scope of the appended claims. Embodiments of the present invention are defined by the following claims, with equivalents of the claims to be included therein.

What is claimed is:

1. A method of manufacturing an LCD panel, the method comprising:
   providing a liquid crystal layer between a display substrate including a pixel electrode and an opposite substrate including a common electrode, the liquid crystal layer including a plurality of pretilted liquid crystal molecules and reactive mesogen ("RM"); and
   providing a first cured layer cured at various first pretilt angles and a second cured layer cured at various second pretilt angles on the display substrate and the opposite substrate, respectively, by curing the reactive mesogen included in the liquid crystal layer
   wherein the providing the first and second cured layers includes:
   forming an electric field at the liquid crystal layer between the pixel electrode and the common electrode by applying a pixel voltage to the pixel electrode and applying a common voltage to the common electrode, at substantially a same time as irradiating light to the liquid crystal layer between the pixel electrode and the common electrode; and
   the forming an electric field comprises changing an intensity of the electric field at substantially the same time as the irradiating light to the liquid crystal layer.

2. The method of claim 1, wherein a voltage level of the pixel voltage gradually increases from a voltage level lower than a critical voltage level for operating the liquid crystal layer in full white mode to a voltage level for operating the liquid crystal layer in full white mode, to change the intensity of the electric field.

3. The method of claim 2, wherein an applying time of the pixel voltage is changed according to the decreasing pixel voltage.

4. The method of claim 1, wherein a voltage level of the pixel voltage gradually increases from a voltage level lower than a critical voltage level for operating the liquid crystal layer in full white mode to a voltage level for operating the liquid crystal layer in full white mode, to change the intensity of the electric field.

5. The method of claim 4, wherein an applying time of the pixel voltage is changed according to the increasing pixel voltage.

6. The method of claim 1, wherein the light is ultraviolet light.

7. The method of claim 1, further comprising:
   providing a switching device connected to a gate line and a data line intersecting each other on a first base substrate;
   providing a passivation layer on the first base substrate on which the switching device is formed;
   providing the pixel electrode comprising a transparent conductive material on the first base substrate on which the passivation layer is formed; and
   providing a first alignment layer on the first base substrate on which the pixel electrode is formed, the first alignment layer being disposed between the first cured layer and the first base substrate.

8. The method of claim 7, further comprising:
   providing a color filter layer on a second base substrate;
   providing the common electrode comprising a transparent conductive material on the second base substrate on which the color filter layer is formed; and
   providing a second alignment layer on the second base substrate on which the common electrode is formed, the second alignment layer being disposed between the second cured layer and the second base substrate.

9. The method of claim 7, wherein the pixel electrode includes:
   a connection electrode portion electrically connected to the switching device, the connection electrode portion dividing a pixel area into a plurality of sub-pixel areas; and
   a plurality of sub-electrode portions extending in different directions from the connection electrode portion, and defining a plurality of domains.

10. A liquid crystal display ("LCD") panel formed by the method of claim 1, and comprising:
    the display substrate including the pixel electrode in a pixel area, and the first cured layer on the pixel electrode;
    the opposite substrate facing the display substrate, and including the common electrode and the second cured layer on the common electrode; and
    the liquid crystal layer between the display substrate and the opposite substrate, the liquid crystal layer including the plurality of liquid crystal molecules pretilted at the various pretilt angles by the first and second cured layers.

11. The LCD panel of claim 10, wherein the pixel electrode includes a plurality of slit patterns, and the common electrode is disposed on a whole surface of the opposite substrate.

12. The LCD panel of claim 10, wherein the pixel electrode includes:
    a connection electrode portion dividing the pixel area into a plurality of sub-pixel areas; and
    a plurality of sub-electrode portions extending in different directions from the connection electrode portion, and defining a plurality of domains.

13. The method of manufacturing an LCD panel, the method comprising:
    providing a liquid crystal layer between a display substrate including a pixel electrode and an opposite substrate including a common electrode, the liquid crystal layer including a plurality of pretilted liquid crystal molecules and reactive mesogen ("RM"); and
    providing a first cured layer cured at various first pretilt angles and a second cured layer cured at various second pretilt angles on the display substrate and the opposite substrate, respectively, by curing the reactive mesogen included in the liquid crystal layer,
    wherein the providing the first and second cured layers includes
    irradiating to the liquid crystal layer between the pixel electrode and the common electrode, at substantially a same time as forming an electric field at the liquid crystal layer between the pixel electrode and the common electrode by applying a pixel voltage to the pixel electrode and applying a common voltage to the common electrode, and
    the irradiating light comprises changing an energy level of light irradiated to the liquid crystal layer, at substantially the same time as applying the pixel voltage to the pixel electrode and applying the common voltage to the common electrode.

14. The method of claim 13, wherein a voltage level of the pixel voltage is substantially the same as a voltage level for operating the liquid crystal layer in full white mode.

15. The method of claim 13, wherein the energy level of the irradiated light gradually decreases from a high energy level to a low energy level.

* * * * *